(12) United States Patent
Ovsiannikov

(10) Patent No.: US 7,386,186 B2
(45) Date of Patent: Jun. 10, 2008

(54) APPARATUS AND METHOD FOR PROCESSING IMAGES

(75) Inventor: Ilia Ovsiannikov, Studio City, CA (US)

(73) Assignee: Micron Technology, Inc., Boise, ID (US)

( * ) Notice: Subject to any disclaimer, the term of this patent is extended or adjusted under 35 U.S.C. 154(b) by 679 days.

(21) Appl. No.: 10/927,308

(22) Filed: Aug. 27, 2004

(65) Prior Publication Data

US 2006/0044431 A1 Mar. 2, 2006

(51) Int. Cl.
*G06K 9/40* (2006.01)
*G09G 1/14* (2006.01)
*G09G 3/28* (2006.01)
*G09G 3/30* (2006.01)
*G09G 5/00* (2006.01)
*G09G 5/02* (2006.01)
*G09G 5/10* (2006.01)

(52) U.S. Cl. .......................... 382/274; 345/20; 345/63; 345/77; 345/581; 345/596; 345/690

(58) Field of Classification Search ............... 382/274; 345/20, 63, 77, 518–618, 690–697
See application file for complete search history.

(56) References Cited

U.S. PATENT DOCUMENTS

| | | | | |
|---|---|---|---|---|
| 5,271,064 | A | * | 12/1993 | Dhawan et al. ............. 382/266 |
| 5,892,850 | A | * | 4/1999 | Tsuruoka ................... 382/240 |
| 6,140,630 | A | | 10/2000 | Rhodes |
| 6,204,524 | B1 | | 3/2001 | Rhodes |
| 6,310,366 | B1 | | 10/2001 | Rhodes et al. |
| 6,326,652 | B1 | | 12/2001 | Rhodes |
| 6,333,205 | B1 | | 12/2001 | Rhodes |
| 6,376,868 | B1 | | 4/2002 | Rhodes |
| 2005/0180654 | A1 | * | 8/2005 | Zhu ........................... 382/269 |

OTHER PUBLICATIONS

Jia-Guu Leu: "Image Contrast Enhancement Based On The Intensities Of Edge Pixels" *CVGIP Graphical Models and Image Processing*, Academic Press, Duluth, MA, US, vol. 54, No. 6, Nov. 1, 1992.

Beghdadi A et al: "Contrast Enhancement Technique Based On Local Detection of Edges" *Computer Vision Graphics and Image Processing*, Academic Press, Duluth, MA, US, vol. 46, No. 2, May 1, 1989.

(Continued)

*Primary Examiner*—Matthew C. Bella
*Assistant Examiner*—Randolph Chu
(74) *Attorney, Agent, or Firm*—Dickstein Shapiro LLP

(57) ABSTRACT

A method and apparatus for processing an image. Specifically, one exemplary embodiment of the method comprises inputting an image into a pixel array producing pixel output signals, executing an image edge detection routine on the pixel output signals that detects pixels defining an image edge, grouping the edge defining pixels into a predetermine plurality of regions based on luminance intensity values of the edge defining pixels, using the grouping to define a non-linear transform function operation over a range of luminance intensity values of the edge defining pixels, applying the non-linear transform function to luminance intensity values, and using the edge defining pixels having the applied non-linear transform function to produce an enhanced image from the input image. One exemplary embodiment of the apparatus comprises a programmed processor that executes the method described above.

48 Claims, 12 Drawing Sheets

OTHER PUBLICATIONS

Matz S C et al: "A localized nonlinear method for the contrast enhancement of images" *Image Processing*, 1999. ICIP 99. Proceedings, 1999 International Conference on Kobe, Japan Oct. 24-28, 1999, Piscataway, NJ, USA, IEEE, US, vol. 3, Oct. 24, 1999.

Chang S-C et al: "Image Contrast Enhancement Based On A Histogram Transformation Of Local Standard Deviation" *IEEE Transactions On Medical Imaging*, IEEE Service Center, Piscataway, NJ, US, vol. 17, No. 4, Aug. 1999.

Digalakis V et al: "Automatic Adaptive Contrast Enhancement For Radiological Imaging" Proceedings Of The International Symposium On Circuits And Systems. (ISCS). Chicago, May 3-6, 1993, New York, IEEE, US, vol. vol. 1, May 3, 1993.

Pratt W.K.: "Digital Image Processing—Third Edition" 2001, John Wiley & Sons, pp. 258-261.

Gonzalez R.C. And Woods R.E.: "Digital Image Processing—Second Edition" 2001, Prentice Hall, pp. 78-108 and 577-580.

International Preliminary Report on Patentability and Written Opinion, Mar. 8, 2007.

* cited by examiner

| 171 (DARK) | 174 (BRIGHT) | 177 (DARK) |
| --- | --- | --- |
| 172 (DARK) | 175 (BRIGHT) | 178 (DARK) |
| 173 (DARK) | 176 (DARK) | 179 (DARK) |

APPARATUS AND METHOD FOR PROCESSING IMAGES

FIELD OF THE INVENTION

The present invention relates to an apparatus and method for processing digital images to enhance the contrast of the image.

BACKGROUND OF THE INVENTION

Integrated circuits, including dies, for example, imager dies such as charge-coupled-devices (CCD) and complementary metal oxide semiconductor (CMOS) dies, have commonly been used in image reproduction applications.

Imager dies, such as the CMOS imager die, typically contain thousands of pixels in a pixel array on a single chip. Pixels convert light into an electrical signal that can then be stored and recalled by an electrical device such as, for example, a processor. The electrical signals that are stored may be recalled to produce an image on, for example, a computer screen or a printable media.

Exemplary CMOS imaging circuits, processing steps thereof, and detailed descriptions of the functions of various CMOS elements of an imaging circuit are described, for example, in U.S. Pat. No. 6,140,630; 6,376,868; 6,310,366; 6,326,652; 6,204,524; 6,333,205 each of which being assigned to Micron Technology, Inc. The disclosures of each of the forgoing patents are hereby incorporated by reference in their entirety.

FIG. 1 illustrates a block diagram of an imager die 10, having a CMOS imager device 8. The CMOS imager device has a pixel array 14 that comprises a plurality of pixels arranged in a predetermined number of columns and rows. The pixel cells of each row in pixel array 14 are all turned on at the same time by a row select line, and the pixel cells of each column are selectively output by respective column select lines. A plurality of rows and column lines are provided for the entire pixel array 14. The row lines are selectively activated in sequence by the row driver 1 in response to row address decoder 2 and the column select lines are selectively activated in sequence for each row activation by the column driver 3 in response to column address decoder 4. The CMOS imager device 8 is operated by the control circuit 5, which controls address decoders 2, 4 for selecting the appropriate row and column lines for pixel readout, and row and column driver circuitry 1, 3 to apply driving voltage to the drive transistors of the selected row and column lines.

The pixel output signals typically include a pixel reset signal $V_{rst}$ taken from a charge storage node when it is reset and a pixel image signal $V_{sig}$, which is taken from the storage node after charges generated by an image are transferred to the node. The $V_{rst}$ and $V_{sig}$ signals are read by a sample and hold circuit 6 and are subtracted by a differential amplifier 7, which produces a difference signal ($V_{rst}-V_{sig}$) for each pixel cell, which represents the amount of light impinging on the pixels. This signal difference is digitized by an analog-to-digital converter 9. The digitized pixel difference signals are then fed to an image processor 11 to form a digital image. In addition, as depicted in FIG. 1, the CMOS imager device 8 may be included on a single semiconductor chip to form the imager die 10. The imager die 10 can be included in a number of image reproduction applications, including, but not limited to, cameras, personal digital assistants (PDAs), scanners, facsimile machines, and copiers.

Users often desire to see images full of contrast in image reproduction applications, such as, for example, a photograph. Such images are visually pleasing because they look lively, clear and have lots of details. Known methods for contrast improvement include modifying transfer function ("s-curve"), contrast stretching, histogram equalization, and amplifying luminance component. Each method has its own drawbacks, which may result in poor image quality.

Accordingly, there is a desire and need for processing an image to increase the contrast of the image, without adversely affecting the visual quality of the image.

BRIEF SUMMARY OF THE INVENTION

The present invention relates to a method and apparatus for processing an image. Specifically, one exemplary embodiment of the method comprises inputting an image into a pixel array producing pixel output signals, executing an image edge detection routine on the pixel output signals that detects pixels defining an image edge, grouping the edge defining pixels into a predetermined plurality of regions based on luminance intensity values of the edge defining pixels, using the grouping to define a non-linear transform function operation over a range of luminance intensity values of the edge defining pixels, applying the non-linear transform function to luminance intensity values, and using the edge defining pixels having the applied non-linear transform function to produce an enhanced image from the input image. One exemplary embodiment of the apparatus comprises a programmed processor that executes the method described above.

BRIEF DESCRIPTION OF THE DRAWINGS

The above-described features of the invention will be more clearly understood from the following detailed description, which is provided with reference to the accompanying drawings in which:

FIG. 3 illustrates a top-down view of a portion of the FIG. 1 pixel array;

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice the invention, and it is to be understood that other embodiments may be utilized, and that structural, logical, and electrical changes may be made without departing from the spirit and scope of the present invention. The progression of processing steps described is exemplary of embodiments of the invention; however, the sequence of steps is not limited to that set forth herein and may be changed as is known in the art, with the exception of steps necessarily occurring in a certain order.

Figure 1:
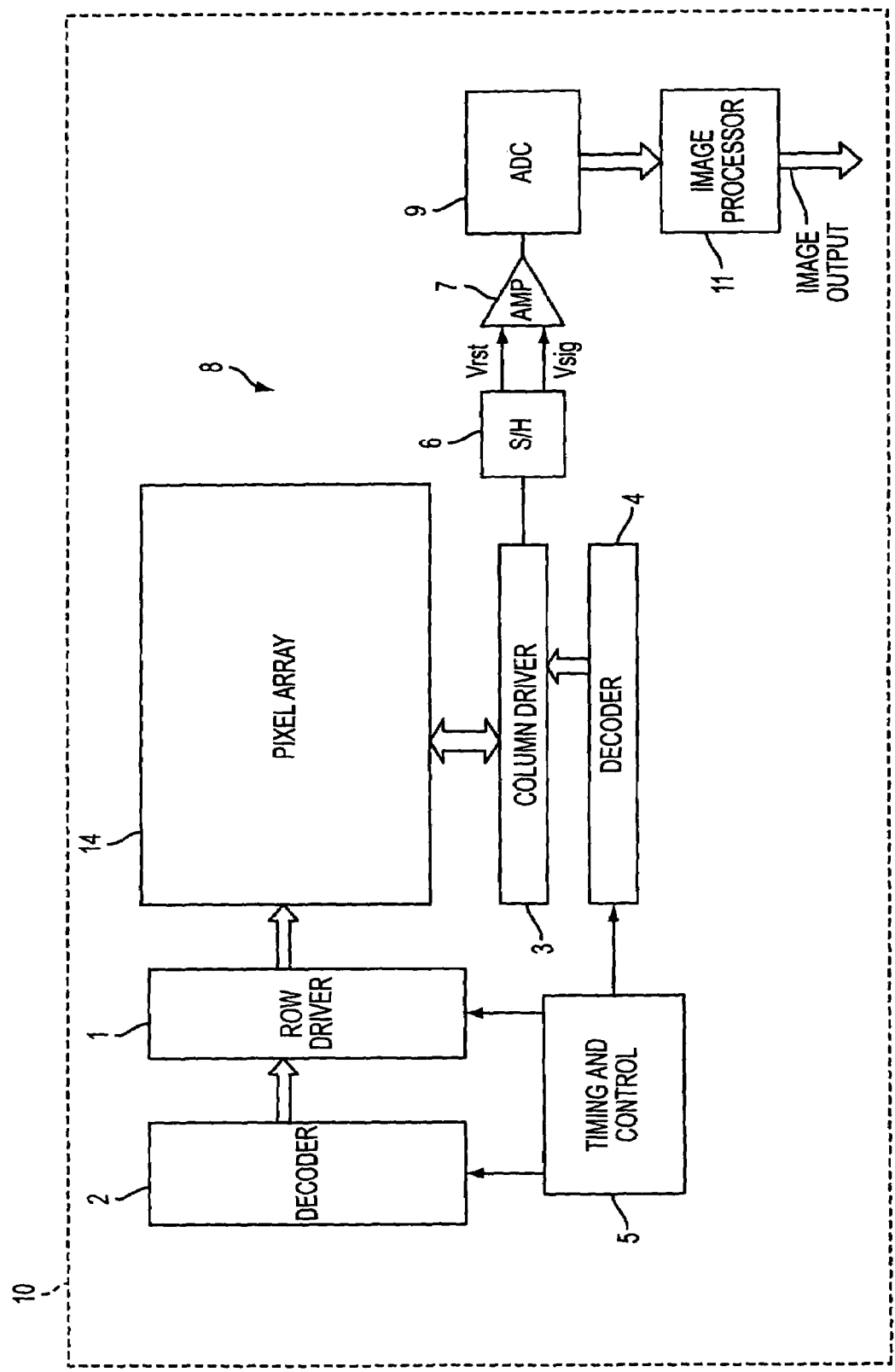
FIG. 1 illustrates a block diagram of a CMOS imager die.
Figure 2:
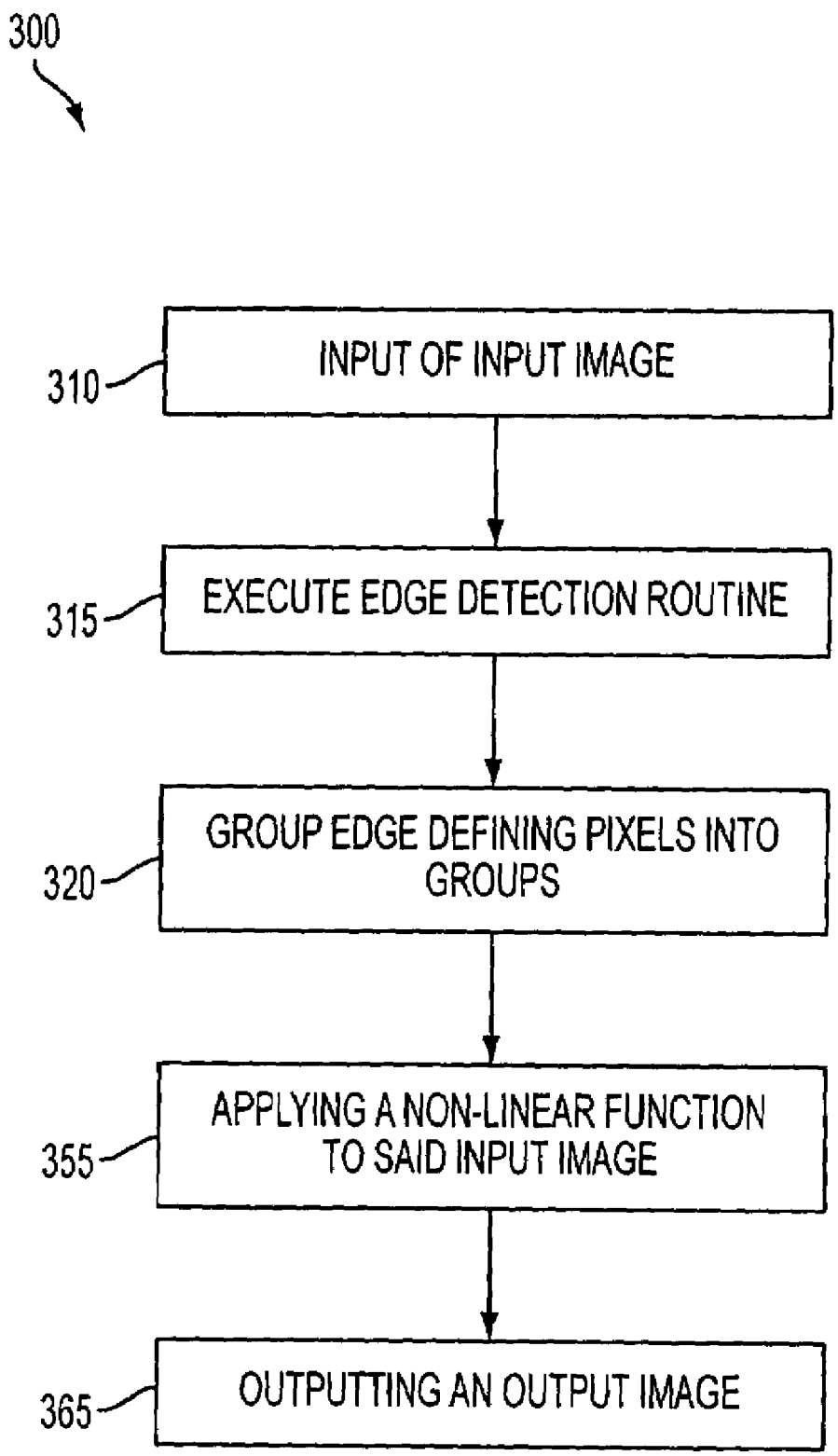
FIG. 2 is a flowchart illustrating a method of processing an input image in accordance with an exemplary embodiment of the invention.

Referring now to the drawings, where like reference numbers designate like elements, FIG. 2 illustrates an exemplary embodiment of a method 300 of processing a digital image to enhance the contrast of the image. Method 300 may be performed by an image processor, e.g., image processor 11 (FIG. 1), or any other processor, e.g., one external to the imager die 10, programmed to perform the following steps: inputting an image (step 310), executing an edge detection routine (step 315), grouping edge defining pixels into a predetermined plurality of groups based on the luminance values of each edge defining pixel (step 320), applying a non-linear function to the luminance values of each edge defining pixel based on their initial luminance values (step 355), and outputting an image (step 365). The steps of the method 300 are discussed in further detail below.

One embodiment of the first step 310 of the method 300 comprises inputting an input image 410 (FIG. 4) through pixels of a pixel array, e.g., pixel array 14 (FIG. 1). Once the input image is input, an edge detection routine (step 315) is executed in accordance with an exemplary embodiment of the present invention. The edges of the input image refer to the areas of the image in which a bright/dark contrast are present.

In addition to detecting both horizontal and vertical edges, as known in the art, the edge detection routine recognizes 45 and 135 degree edges as well. The edges of an image are typically detected within a cluster of pixels. For example, FIG. 3 illustrates a top-down view of a portion of the pixel array 14 (FIG. 1) of an imaging device, e.g. imager die 10 (FIG. 1), having pixels 171-179. Each pixel of the pixel array 14 (FIG. 1) has an associated luminance intensity value, or luminosity, ranging from 0 to 255 for an 8 bit grayscale image.

Each pixel of the pixel array is examined to determine whether it is an edge defining pixel based on the associated luminance intensity value. In examining a pixel, e.g., bright pixel 175, the surrounding pixels (adjacent pixels 171-174, 176-179) are analyzed to determine whether any of the adjacent pixels 171-174, 176-179 define an edge with the examined pixel. If the pixels adjacent to the pixel under examination do not have a luminance intensity value sufficient to define an edge, the examined pixel will be discarded. If, on the other hand, as illustrated in FIG. 3, one or more of the adjacent pixels 171-174, 176-179 of the pixel under examination (examined pixel 175) does define an edge, the examined pixel 175 and any other adjacent pixels defining an edge can be processed further. In order to define an edge the difference in luminosity values of adjacent bright and dark pixels must exceed a predetermined threshold, which may be a programmable value.

FIG. 3 illustrates an edge defined between examined pixel 175 and adjacent pixels 171, 172, 173, 176, 177, 178, and 179; however, no edge is defined between examined pixel 175 and pixel 174 because the difference in luminance intensity value is such that an edge is not detected. Similarly, examined pixel 174 is detected as defining an edge with adjacent pixels 171 and 177. Accordingly, the illustrated pixels 171-179 are considered to be edge defining pixels, and are further processed.

It should be noted that the preceding edge detection routine is only an exemplary embodiment, and is not intended to be limiting in any way. For example, other edge detection routines known in the art could be used.

Figure 4:
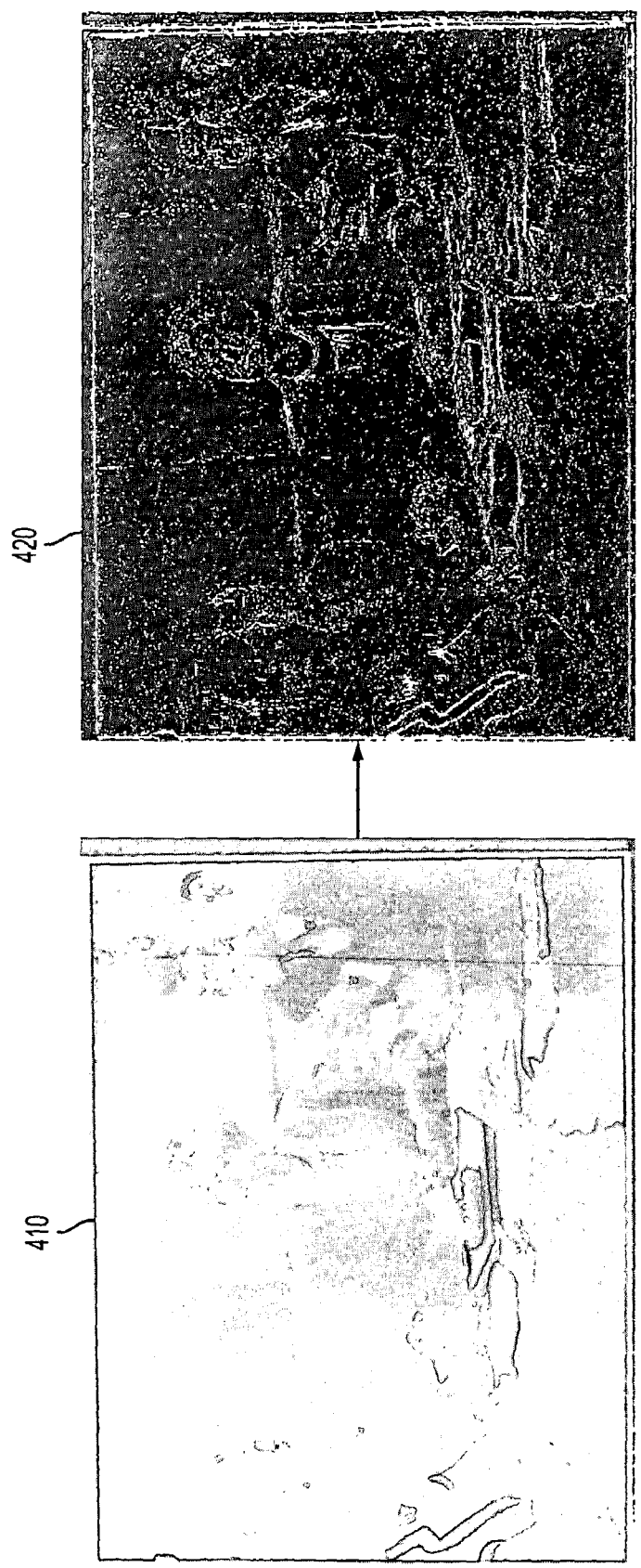
FIG. 4 illustrates the construction of an edge map from an input image in accordance with an exemplary embodiment of the invention.

Referring to FIG. 4, the pixels defining an edge can be used to construct an edge map 420. It should be noted that constructing an edge map is not essential to the method 300 (FIG. 2), and need not be performed. The edge map 420 is only a representation of the electrical signals output by the edge pixels capturing the input image 410. It should be noted that pixels that are not recognized as defining edges also capture portions of the input image 410. The electrical signals from those pixels not defining edges are used to output an output image (step 365 (FIG. 2)).

Figure 5:
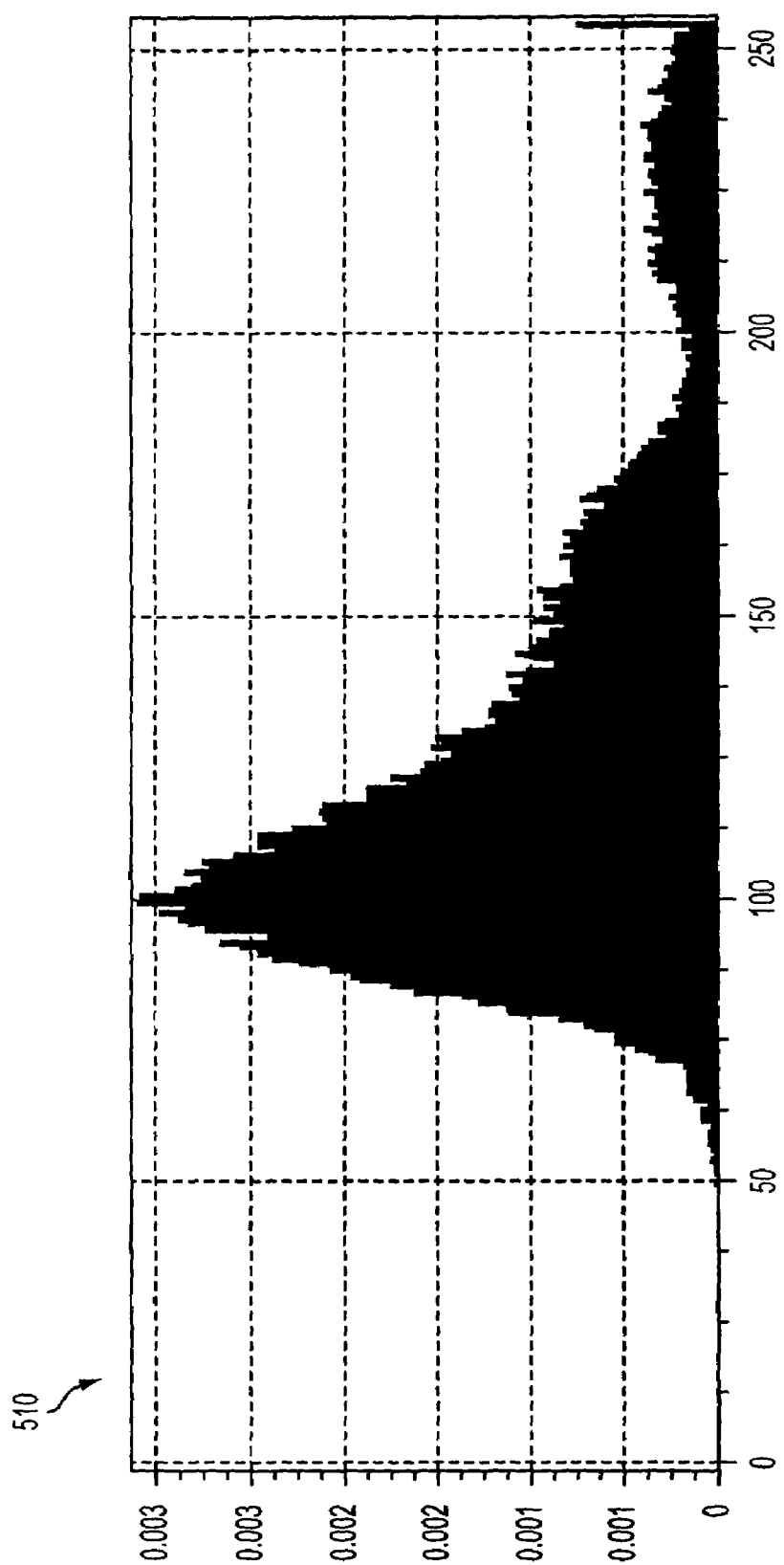
FIG. 5 illustrates an input luminance histogram representing any edge pixels.

Referring to FIG. 2, a predetermined number of edge defining pixels can be categorized into a predetermined plurality of groups based on the luminance value of each pixel (step 320). For example, all edge defining pixels can be categorized into one of 256 groups, i.e., 0 to 255, each group representing a different luminance value. Referring to FIG. 5, an input luminance histogram 510 may be created to illustrate the grouping of the edge defining pixels having a corresponding luminance intensity value.

In further processing, a non-linear function is applied to the luminance intensity values associated with each edge defining pixel (step 355 (FIG. 2)). The non-linear function applies a value to the luminance intensity value of each edge defining pixel by which the luminance value is either increased or decreased, as discussed in greater detail below. The increase/decrease of the luminance intensity values of the edge defining pixels increases the contrast of the input image. The increased/decreased luminance intensity values are output in an output image (step 365 (FIG. 2)). The output image has an enhanced contrast with better defined edges.

The non-linear function is determined by initially grouping the edge defining pixels into regions based on the associated luminance intensity values of each pixel. As discussed above, each pixel has an associated luminance intensity value, and each is grouped into a predetermined plurality of groups, e.g., 0 to 255. These groups are further categorized into a predetermined plurality of regions. For example, the edge pixels that correspond to a luminance intensity value of less than a particular number, such as, for example, 8, can be grouped together, as region 1. The edge pixels that correspond to a luminance intensity value of 8-15 can be grouped as region 2, and so forth, until all of the pixels having edges have been grouped into, for example, 32 regions, each region having 8 luminance intensity values to cover the 256 possible luminance intensity values of a pixel, essentially creating a histogram having 32 regions. Although described as being divided into 32 equal regions, the pixels could be divided into less or more regions, i.e. less than or more than 32 regions, based on the desired application. Further, it should also be noted that the pixels need not be divided equally.

Once the pixels have been grouped into regions, each region is assigned a contrast enhancement value. In an exemplary embodiment, the contrast enhancement value ($c_{vx}$) is assigned in accordance with the following formula:

$$c_{vx} = \alpha(N_x/N_{total})^\gamma, \tag{3}$$

where X represents the region for which the contrast enhancement value is being assigned, e.g., 1-32, $\alpha$ and $\gamma$ are empirical constants, $N_x$ represents the number of pixels in the corresponding region, and $N_{total}$ represents the total number of pixels in the pixel array. For example, in calculating the contrast enhancement value of region 1 of 32 regions, e.g., $c_{v1}$, $N_1$ represents the number of pixels in region 1, and $N_{total}$ represents the total number of pixels. In an exemplary embodiment, $\alpha$ equals 1 and $\gamma$ equals 0.5.

In another exemplary embodiment, the contrast enhancement values ($c_{vx}$) for dark and bright regions can be created. For example, regions 1 and 32 could be set to a value of 1, i.e., $c_1$ and $c_{32}$ equal a value of 1. The dark and bright regions prevent bright images from becoming even brighter and dark images from becoming even darker as discussed below in greater detail.

Figure 6:
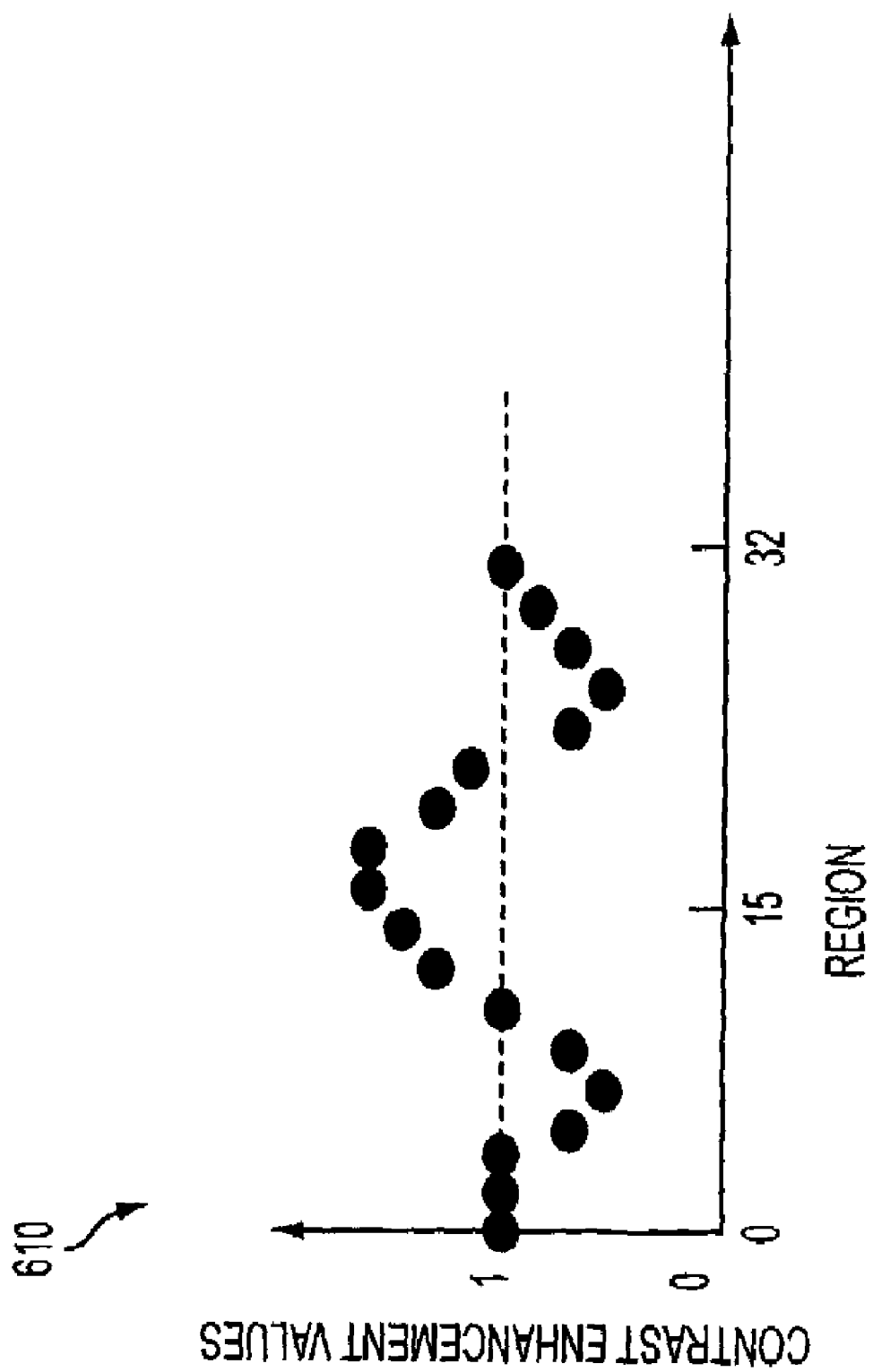
FIG. 6 illustrates a contrast enhancement map constructed in accordance with an exemplary embodiment of the invention.

Referring to FIG. 6, once each of the predetermined number of regions is assigned a contrast enhancement value ($c_{vx}$), a contrast enhancement map 610 may be created. In the illustrated example, the contrast enhancement values of regions 1, 2, and 3, e.g., $c_1$, $c_2$, $c_3$ and region 32, e.g., $c_{32}$, are set to a value of 1 to create dark and bright regions, respectively. A region 0 is also created to establish a base value. Region 0, e.g., co is also set to a value of one. It should be noted that the construction of a contrast enhancement map 610 is optional, and is not intended to be limiting in any way. The electrical signals that are output by the pixels defining edges are assigned contrast enhancement values, and are further processed.

Figure 7:
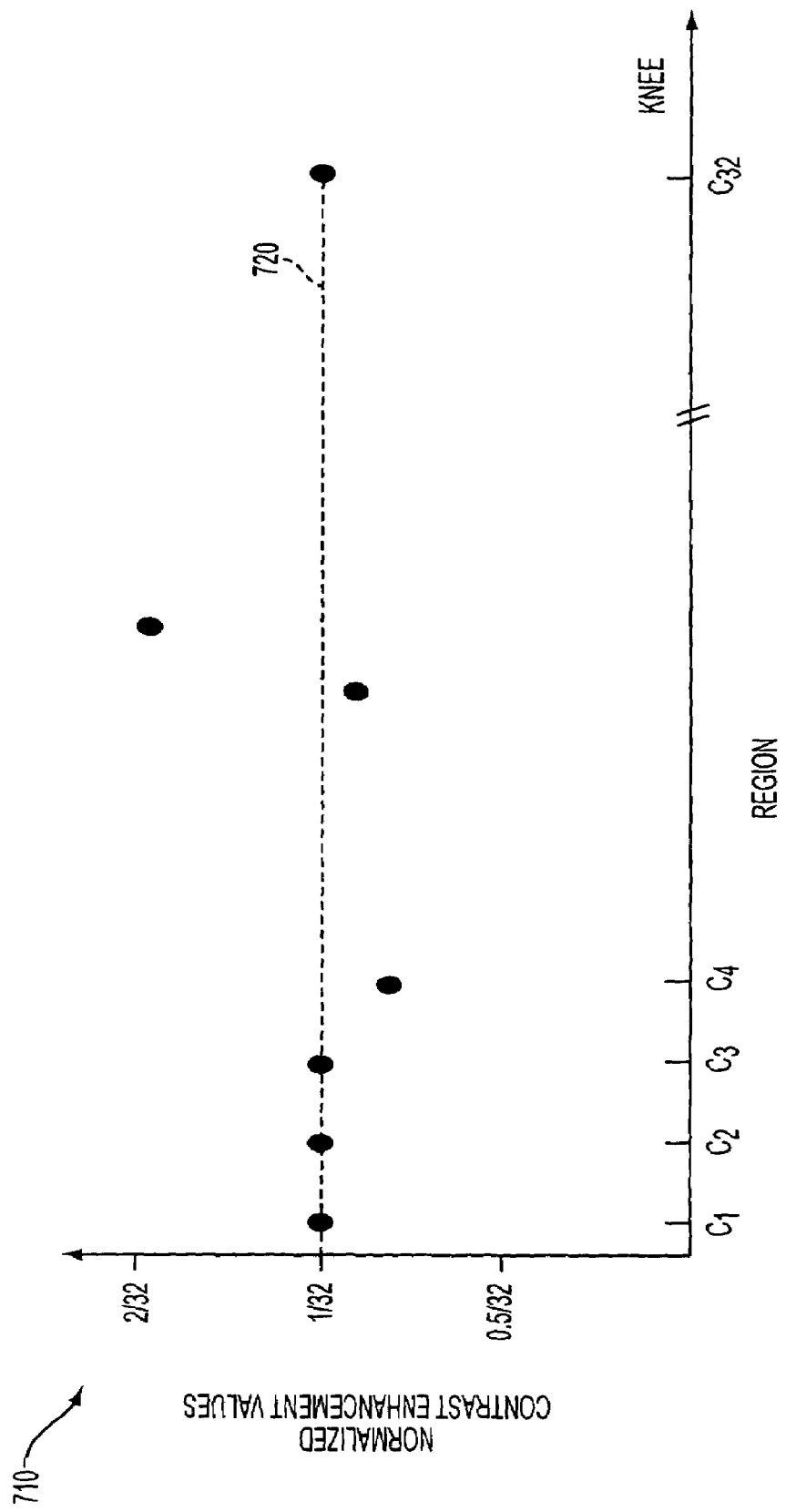
FIG. 7 illustrates a normalized contrast enhancement map constructed in accordance with an exemplary embodiment of the invention.

Next, each contrast enhancement value ($c_{vx}$) is normalized. In one exemplary embodiment, each contrast enhancement value ($c_{vx}$) is normalized in accordance with the following formula:

$$C_{vx} = c_{vx}/\text{sum}(c_j), \tag{4}$$

where j represents $x_{lo}$ through $x_{high}$, i.e., $c_1 + c_2 + c_3 \ldots + c_{32}$. The normalized contrast enhancement value ($C_{vx}$) of each region can be mapped to create a normalized contrast enhancement value map 710 (FIG. 7). As illustrated, the luminance intensity values of those pixels that are included in a region that fall below horizontal line 720 will have a value of less than 1 applied to them, thereby making the pixels darker. The luminance intensity values of those pixels that are included in a region that is above horizontal line 720 will have a value greater than 1 applied to them, thereby making the pixels brighter. It should be noted that the mapping of the normalized contrast enhancement values is optional, and not intended to be limiting in any way.

Because regions 1, 2, 3, and 32 were assigned a contrast enhancement value of 1, and, therefore, a normalized contrast enhancement value of 1/32, the luminance intensity values of pixels that are included in regions 1, 2, 3, and 32 will not be increased or decreased, thereby preventing the darkest pixels from becoming even darker, and preventing the brightest pixels from becoming even brighter. It should be noted that setting regions 1, 2, 3, and 32 to a value of 1 is only optional, and none of the regions need be assigned a contrast enhancement value equal to 1. Alternatively, it should be noted that more or less of the regions can be assigned a contrast enhancement value equal to a value of 1.

After assigning the normalized contrast enhancement value (Cvx) to each region, the normalized contrast enhancement value (Cvx) is used to generate a transform function. In one exemplary embodiment, the transform function is generated in accordance with the following formula:

$$f(x+1) = F(x) + C_{vx}, \tag{5}$$

where f represents a function used on each of the 32 regions discussed above, and F represents the integration function for each region. A first region, 0, is set to 0; i.e., f(0)=0. The last region, 32, is set to 1, i.e., f(32)=1. For the first region, f(1)=0+$C_{v1}$, adding $C_{v1}$ to $C_{v0}$, which was set to zero (0). For the second region, f(2)=0+$C_{v1}$+$C_{v2}$ and so forth. Although optional, the transform function can be mapped to generate a transform function graph 810 (FIG. 8).

Figure 8:
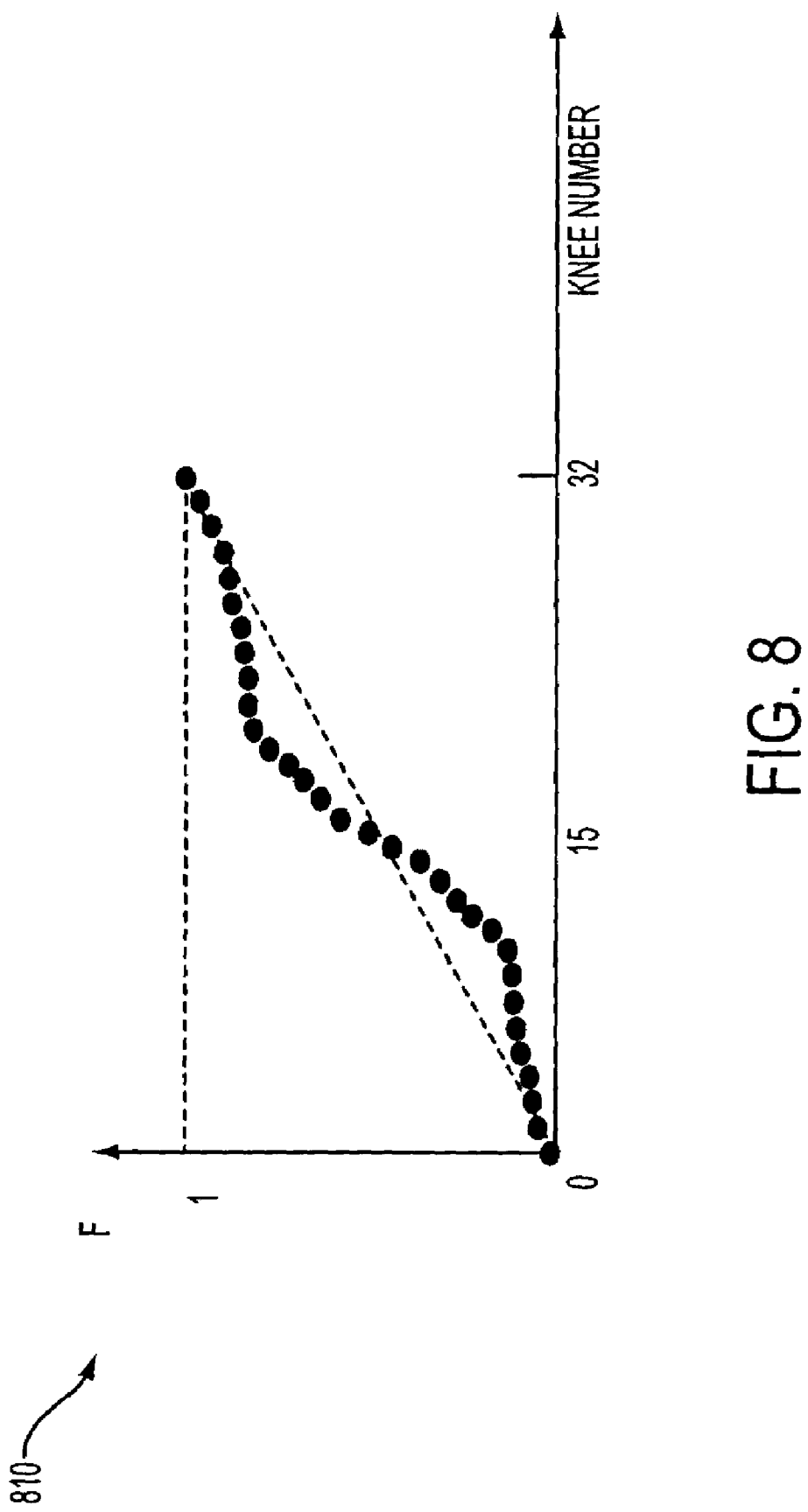
FIG. 8 illustrates a transform function map constructed in accordance with an exemplary embodiment of the invention.
Figure 9:
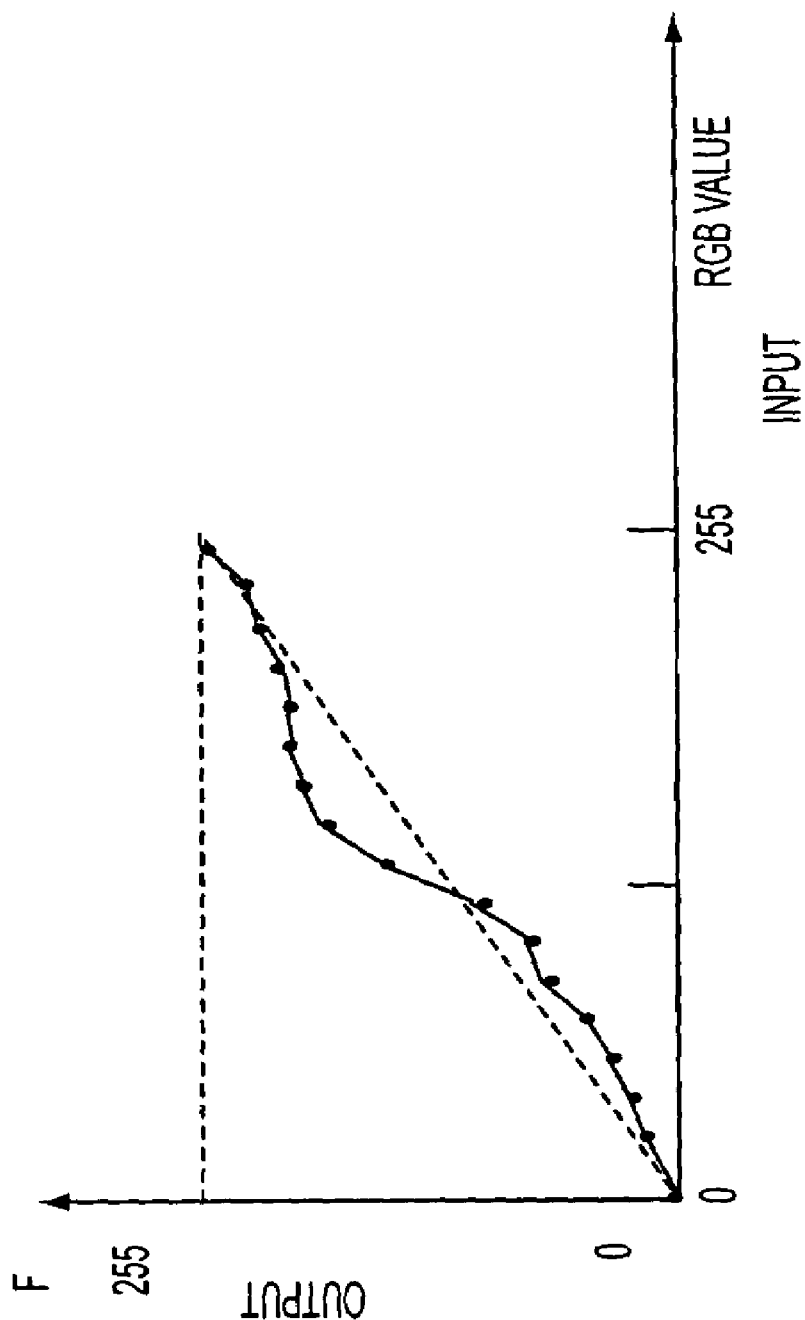
FIG. 9 illustrates the extrapolation of a non-linear transform function map from the FIG. 10 transform function map constructed in accordance with an exemplary embodiment of the invention.

As illustrated in FIG. 8, the function derived from the normalized contrast enhancement values (Cvx) represent thirty-three (33) different points on a graph (thirty-two regions in addition to the base value 0 discussed above with respect to FIG. 6). The 33 points depicted in the FIG. 8 transform function graph 810 are then used to extrapolate a non-linear transform function in accordance with the following formula:

$$F_Y = O_X + C_{VX} * (Y \bmod Z) * P, \tag{6}$$

where F represents the non-linear transform function, Y represents the individual intensity level (e.g., 0-255), $C_{vx}$ represents the contrast enhancement value discussed above, P represents the number of predetermined number of regions the input luminance histogram is divided into, and Z represents the number of intensity levels divided by P. For example, if the pixels were encoded as RGB 8-bit triplets and P=32, Z would equal (255+1)/32=8. In formula (6), Ox represents the output luminance, and is calculated using the following formula:

$$O_X = \text{sum}(C_M) * I, \tag{7}$$

where $C_M$ represents the contrast enhancement value of 1 through x−1, wherein x equals 1-32, and I represents the number of intensity values in the input luminance histogram. In the input luminance histogram 510 (FIG. 5), I=256. The extrapolation of the non-linear transform function is illustrated in FIG. 9.

Figure 10:
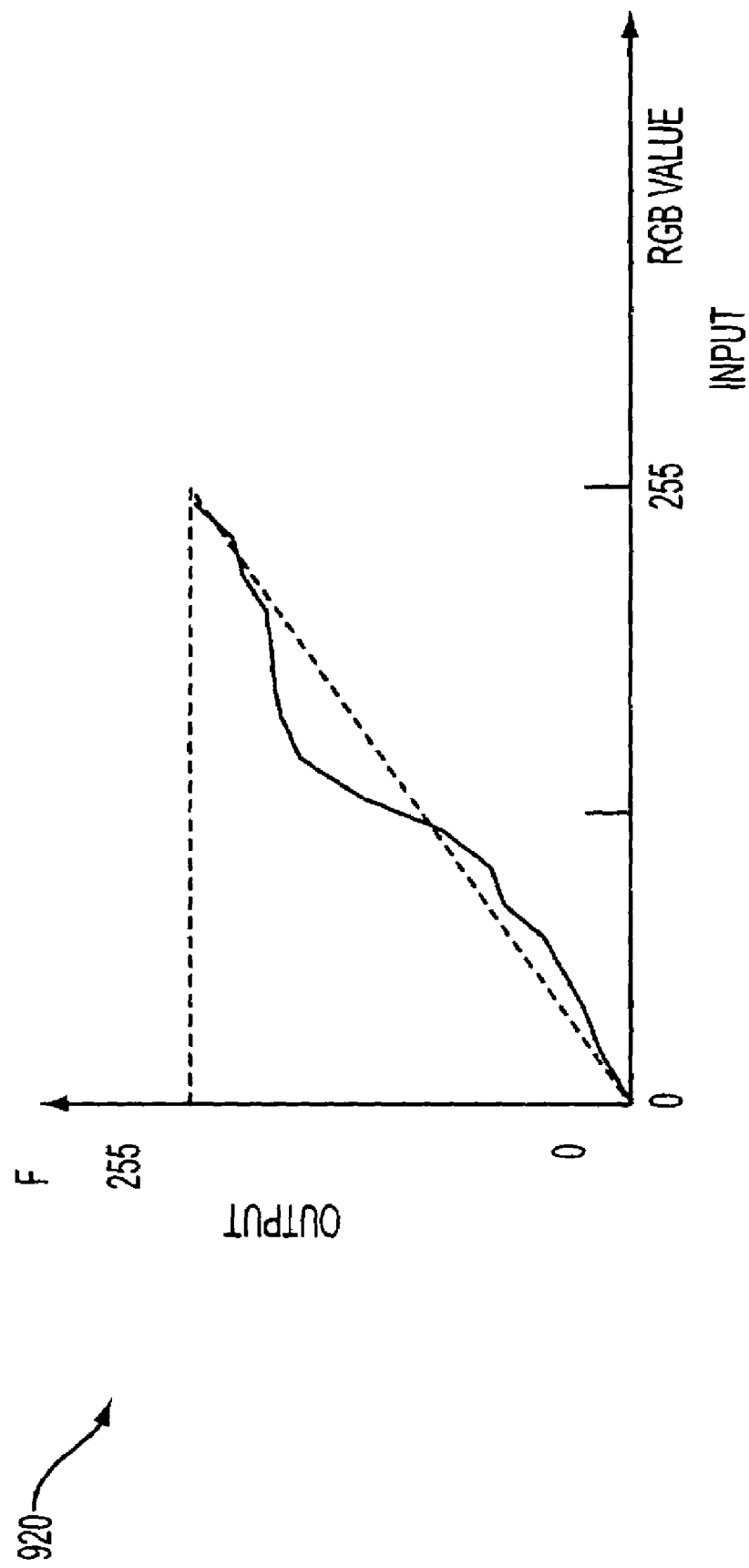
FIG. 10 illustrates a non-linear transform function map constructed in accordance with an exemplary embodiment of the invention.
Figure 11:
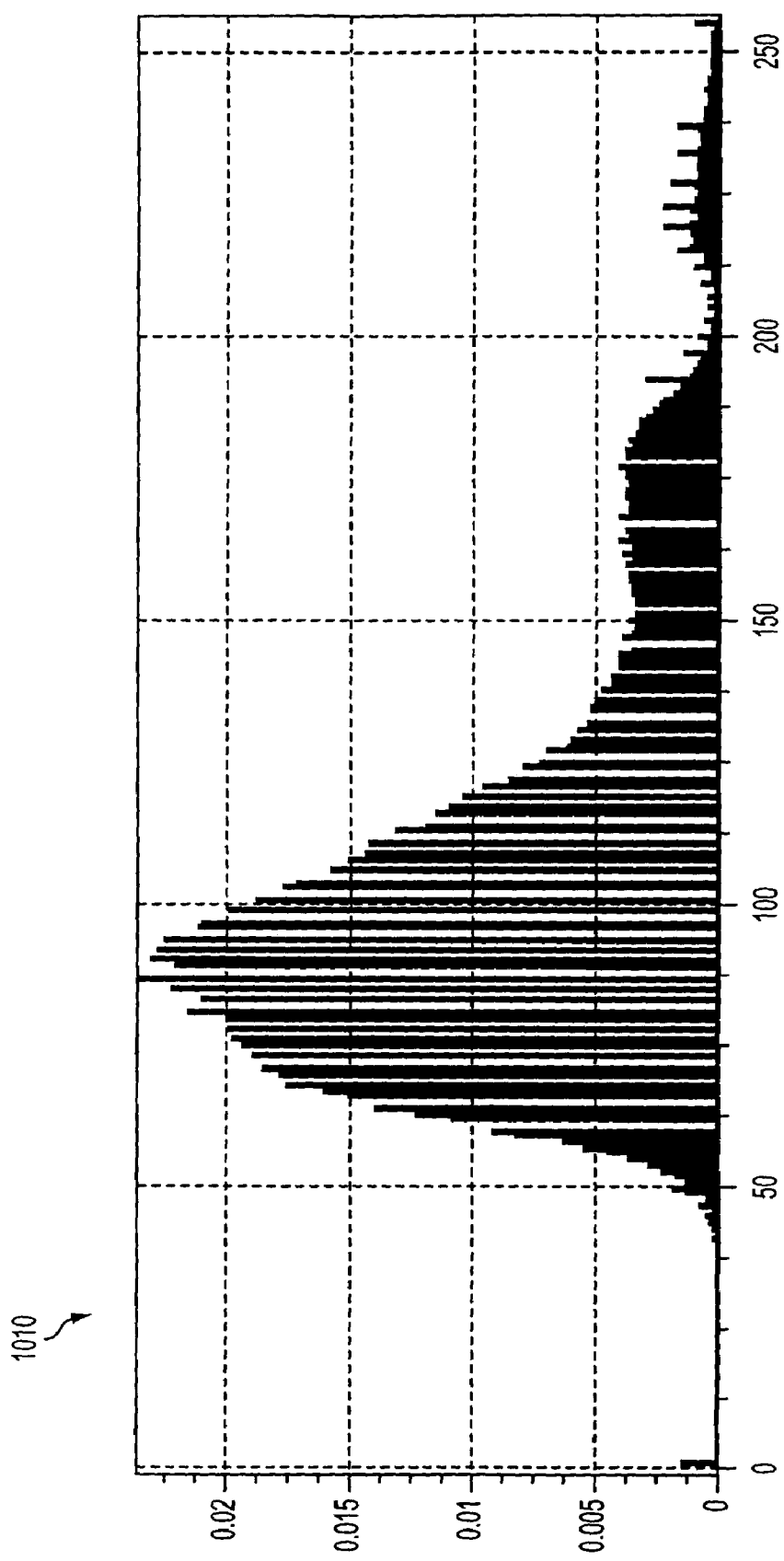
FIG. 11 illustrates an output luminance histogram constructed in accordance with an exemplary embodiment of the invention.

Although only optional, the non-linear transform function, once extrapolated can be mapped onto a non-linear transform function map 920, illustrated in FIG. 10. As illustrated, each of the 256 output luminance values (e.g., 0-255) is assigned a non-linear transform function value. The non-linear transform function is then applied to the luminance intensity values of the edge pixels capturing the input image, represented in the input luminance histogram 510 (FIG. 5). The application of the non-linear transform function to the edge defining pixels capturing the input image results in electrical signals that can be represented by an output luminance histogram 1010, illustrated in FIG. 11. As illustrated, the output luminance histogram 1010 is a "stretched" histogram. It should be noted that the generation of the output luminance histogram 1010 is only a representation of the processing of the electrical signals output by the edge defining pixels. The output luminance histogram 1010 only illustrates the processed grouping of the edge defining pixels having corresponding luminance intensity values.

The method 300 concludes by outputting an output image (step 365), as discussed above. The output image is based on the processed electrical signals from the edge defining pixels, and electrical signals output by pixels not recognized as having edges, that, when combined, capture the full input image 410 (FIG. 4). The output image has clearer edges, thereby appearing to have enhanced contrast, without adversely affecting the visual quality of the image. The output image also has richer detail in over-developed and under-developed input images.

It should be noted that the application of the non-linear function does not need to be performed on every luminance intensity value (e.g., 0-255), but could be applied to just a range of luminance intensity values. For example, the non-linear function can be applied to pixels that are recognized as dark pixels (e.g., pixels having a luminance intensity value of 0-128); thereby changing the luminance intensity values of the dark pixels only. Similarly, the non-linear function can be applied to pixels that are recognized as bright pixels (e.g., pixels having a luminance intensity value of 129-255); thereby changing the luminance intensity values of the bright pixels only. The application of the non-linear function to dark pixels only or bright pixels only has the same effect of enhancing the contrast of a processed image.

Although the invention has been described with respect to 8 bit processing (resulting in 256 luminance intensity values), the invention is not so limited. For example, 12 bit, 16 bit, and other bit processing may also be used which would entail a higher range of luminance intensity values.

Figure 12:
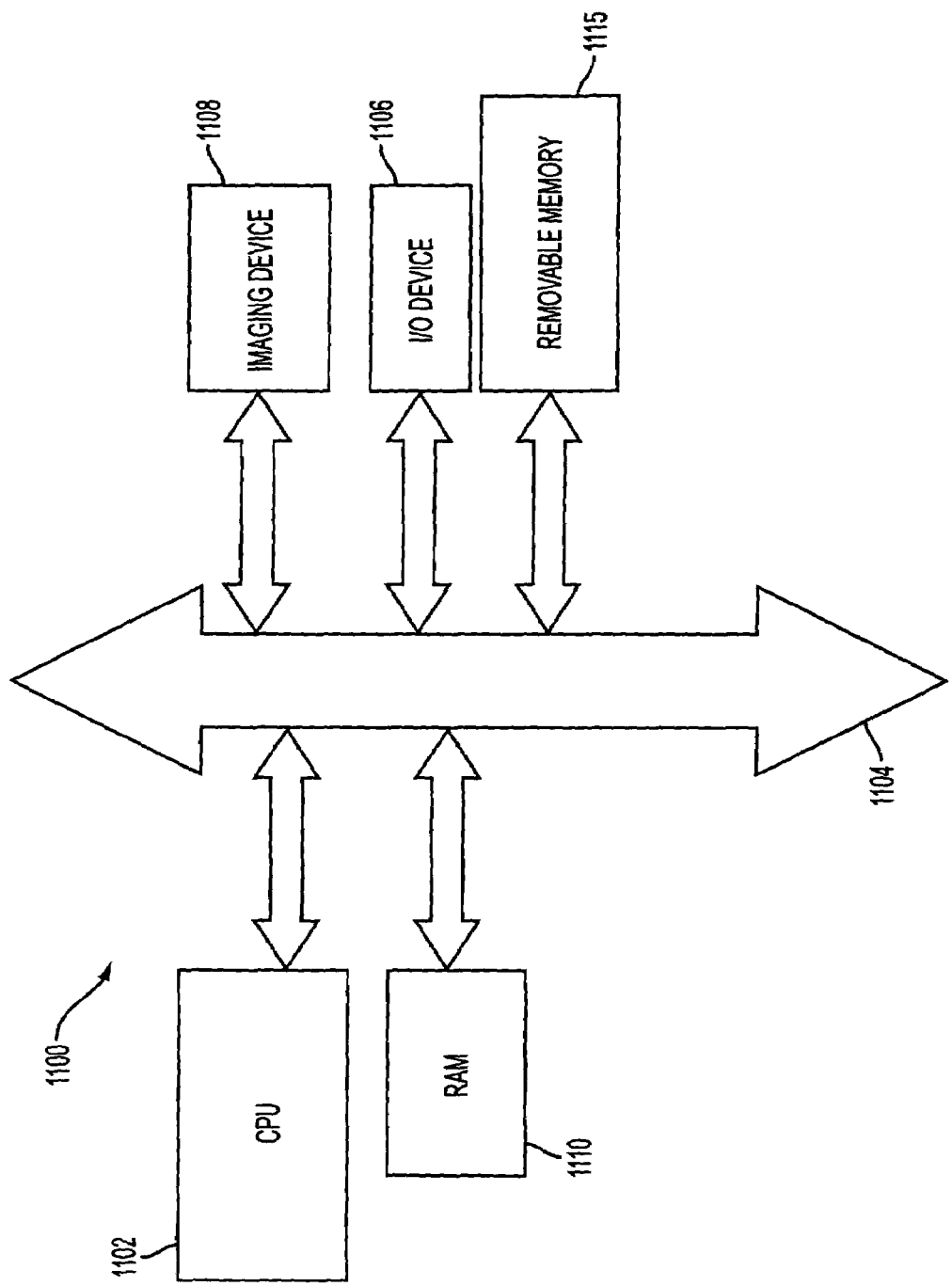
FIG. 12 illustrates a block diagram of a processor-based system constructed in accordance with an exemplary embodiment of the invention.

FIG. 12 illustrates a processor-based system 1100 including an imaging device 1108, which may include an imager die 10 (FIG. 1), utilizing the method of processing an image in accordance with the invention. The processor-based system 1100 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

The processor-based system 1100, for example a camera system, generally comprises a central processing unit (CPU) 1102, such as a microprocessor, that communicates with an input/output (I/O) device 1106 over a bus 1104. Imaging device 1108 also communicates with the CPU 1102 over the bus 1104, and may include the imager die 10 discussed above with respect to FIG. 1. The processor-based system 1100 also includes random access memory (RAM) 1110, and can include removable memory 1115, such as flash memory, which also communicates with CPU 1102 over the bus 1104. Imaging device 1108 may be combined with a processor, such as a CPU, digital signal processor, or microprocessor, with or without memory storage on a single integrated circuit or on a different chip than the processor. Any of the memory storage devices in the processor-based system 1100 could store software for employing the above-described method.

The processor for producing an output image in accordance with the process described and illustrated with reference to FIGS. 2-11 may be conducted by the image processor 11 or by the CPU 1102, or by yet another processor communicating with system 1100. Although the invention has been described with particular application to a grayscale histogram, it should be noted that the invention could be applied to histograms of color images that may be taken in the form of individual histograms of red, green, and blue channels, or three-dimensional histograms. It should also be noted that although the invention has been described with respect to CMOS and CCD imagers, the invention is not so limited. For example, the invention could be applied to various types of imagers, such as scanners, copiers, and facsimile machines.

The above description and drawings illustrate preferred embodiments which achieve the objects, features, and advantages of the present invention. Although certain advantages and preferred embodiments have been described above, those skilled in the art will recognize that substitutions, additions, deletions, modifications and/or other changes may be made without departing from the spirit or scope of the invention. Accordingly, the invention is not limited by the foregoing description but is only limited by the scope of the appended claims.

What is claimed as new and desired to be protected by Letters Patent of the United States is:

1. A method of processing an input image, said method comprising:
    inputting said input image into a pixel array producing pixel output signals having luminance intensity values;
    executing an image edge detection routine on said pixel output signals, said image edge detection routine detecting pixels defining an image edge;
    grouping said edge defining pixels into a predetermined plurality of regions based on luminance intensity values of said edge defining pixels;
    using said grouping to define a non-linear transform function operation over a range of luminance intensity values of said pixel array;
    applying said non-linear transform function to luminance intensity values of said edge defining pixels capturing said input image; and
    using the edge defining pixels having the applied non-linear transform function to produce an enhanced image from said input image;
    wherein the act of applying said non-linear transform function comprises:
    assigning a contrast enhancement value to each of said predetermined plurality of regions;
    normalizing each of said assigned contrast enhancement values;
    generating a transform function for each of said normalized contrast enhancement values; and
    extrapolating said non-linear transform function from said transform function.

2. The method of claim 1, wherein said edge detection routine recognizes horizontal and vertical edges in said image.

3. The method of claim 2, wherein said edge detection routine further recognizes 45 and 135 degree edges in said image.

4. An apparatus for processing an input image, said apparatus comprising:
    a programmed processor, said programmed processor executing the steps of:
    inputting said input image into a pixel array producing pixel output signals having luminance intensity values;
    executing an image edge detection routine, said image edge detection routine detecting pixels defining an image edge;
    grouping said edge defining pixels into a predetermined plurality of regions based on luminance intensity values of said edge defining pixels;

using said grouping to define a non-linear transform function operation over a range of luminance intensity values of said pixel array;

applying said non-linear transform function to luminance intensity values of said edge defining pixels capturing said input image; and using the edge defining pixels having the applied non-linear transform function to produce an enhanced image from said input image;

wherein the act of applying said non-linear transform function comprises:

assigning a contrast enhancement value to each of said predetermined plurality of regions;

normalizing each of said assigned contrast enhancement values;

generating a transform function for each of said normalized contrast enhancement values; and extrapolating said non-linear transform function from said transform function.

5. The apparatus according to claim 4, wherein said edge detection routine executed by said apparatus recognizes horizontal and vertical edges in said image.

6. The apparatus according to claim 5, wherein said edge detection routine executed by said apparatus further recognizes 45 and 135 degree edges in said image.

7. An apparatus for processing an image, said apparatus comprising a computer readable storage medium having a program for processing an image, said program executing the steps of:

inputting said image into a pixel array producing pixel output signals having luminance intensity values;

executing an image edge detection routine, said image edge detection routine detecting pixels defining an image edge;

grouping said edge defining pixels into a predetermined plurality of regions based on luminance intensity values of said edge defining pixels;

assigning contrast enhancement values to each of said predetermined plurality of regions;

normalizing said contrast enhancement values;

generating a transform function based on said normalized contrast enhancement values;

extrapolating a non-linear transform function based on said transform function;

applying said non-linear transform function to luminance intensity values of said edge defining pixels capturing said image; and using the edge defining pixels having the applied non-linear transform function to produce an enhanced image from said image.

8. An imaging device, said imaging device comprising:

an means for inputting an image into a pixel array producing pixel output signals having luminance intensity values;

a means for detecting pixels defining image edges of said image;

a means for grouping said edge defining pixels into a predetermined plurality of regions based on luminance intensity values of said edge defining pixels;

a means for assigning a contrast enhancement value to each of said predetermined plurality of regions, a means for normalizing said contrast enhancement values;

a means for generating a transform function based on said normalized contrast enhancement values;

a means for extrapolating a non-linear transform function based on said transform function;

a means for applying said non-linear transform function to luminance intensity values of said edge defining pixels capturing said image; and using the edge defining pixels having the applied non-linear transform function to produce an enhanced image from said image.

9. A processor system, comprising:

an image processing device comprising;

a programmed processor, said programmed processor executing the steps of:

inputting an input image into a pixel array producing pixel output signals having luminance intensity values;

executing an image edge detection routine, said image edge detection routine detecting pixels defining an image edge;

grouping said edge defining pixels into a predetermined plurality of regions based on luminance intensity values of said edge defining pixels;

using said grouping to define a non-linear transform function operation over a range of luminance intensity values of said pixel array;

applying said non-linear transform function to luminance intensity values of said edge defining pixels capturing said input image; and using the edge defining pixels having the applied non-linear transform function to produce an enhanced image from said input image;

wherein the act of applying said non-linear transform function comprises:

assigning a contrast enhancement value to each of said predetermined plurality of regions;

normalizing each of said assigned contrast enhancement values;

generating a transform function for each of said normalized contrast enhancement values; and extrapolating said non-linear transform function from said transform function.

10. The system of claim 9, wherein said image processing device is a complementary metal oxide semiconductor imager.

11. The system of claim 9, wherein said image processing device is a charge-coupled-device.

12. The system of claim 9, wherein said image processing device is a digital copier.

13. The system of claim 9, wherein said image processing device is a facsimile machine.

14. The system of claim 9, wherein said image processing device is a scanner.

15. A method of processing an input image, said method comprising:

producing an enhanced image from the input image by applying a non-linear transform function to the luminance intensity values of edge defining pixels in the input image, the non-linear transform function comprising:

assigning contrast enhancement values to a predetermined plurality of regions in the input image based on the luminance intensity values of the edge defining pixels;

normalizing each of said assigned contrast enhancement values;

generating a transform function for each of said normalized contrast enhancement values; and extrapolating said non-linear transform function from said transform function.

16. The method of claim 15, wherein said range of luminance intensity values comprises luminance intensity values of bright and dark pixels.

17. The method of claim 16, wherein said luminance intensity values of said bright and dark pixels comprises the range of values possible with a bit depth selected from the group of 8-bits, 12-bits or 16-bits.

18. The method of claim 15, wherein said range of luminance intensity values comprises luminance intensity values of dark pixels.

19. The method of claim 18, wherein said luminance intensity values of said dark pixels includes 0-128.

20. The method of claim 15, wherein said range of luminance intensity values comprises luminance intensity values of bright pixels.

21. The method of claim 20, wherein said luminance intensity values of said bright pixels includes 129-255.

22. The method of claim 15, wherein said predetermined plurality of regions comprises 32 regions.

23. The method of claim 22, wherein each of said 32 regions contains an equal number of luminance intensity values.

24. The method of claim 23, wherein each of said 32 regions contains 8 luminance intensity values.

25. The method of claim 22, wherein each of said 32 regions contains an unequal number of luminance intensity values.

26. The method of claim 15, wherein said contrast enhancement value is assigned in accordance with the formula:

$$c_{vx} = \alpha(N_x/N_{total})^\gamma,$$

wherein $\alpha$ and $\gamma$ are empirical constants, $N_x$ represents the number of pixels in the corresponding region, and $N_{total}$ represents the total number of pixels.

27. The method of claim 26, wherein $\alpha$ equals 1 and $\gamma$ equals 0.5.

28. The method of claim 15, wherein a first region represents a dark region, said dark region being assigned a contrast enhancement value of 1.

29. The method of claim 28, wherein a last region represents a bright region, said bright region being assigned a contrast enhancement value of 1.

30. The method of claim 15, wherein said normalizing step is performed in accordance with the formula:

$$C_{vx} = c_{vx}/\text{sum}(c_j),$$

wherein $C_{vx}$ represents an individual normalized contrast enhancement, $c_{vx}$ represents an individual contrast enhancement value assigned to each of said predetermined number of regions, and $c_j$ represents the total of all contrast enhancement values assigned to each of said predetermined plurality of number of regions.

31. The method of claim 15, wherein said transform function is generated in accordance with the formula:

$$f(x+1) = F(x) + C_{vx},$$

wherein x represents an individual region, f represents a function applied to each of said predetermined number of regions, F represents the integration function for each of said predetermined number of region, and $C_{vx}$ represents said normalized contrast enhancement value for said region.

32. The method of claim 15, wherein said extrapolation step is calculated in accordance with the formula:

$$F_Y = O_x C_{vx} * (Y \bmod Z) * P,$$

wherein, F represents a function, Y represents individual intensity levels of said input luminance histogram, $C_{vx}$ represents the normalized contrast enhancement values assigned to each of said predetermined number of regions, Z represents a number of intensity levels divided by P, P represents the number of predetermined number of regions, and $O_x = \text{sum}(C_M) * I$, wherein $C_M$ represents the assigned contrast enhancement value of an individual intensity level added to each contrast enhancement value of a preceding individual intensity, and I represents the number of intensity values in said input luminance histogram.

33. An apparatus for processing an input image, said apparatus comprising:
processing circuit configured to execute the steps of:
producing an enhanced image from the input image by applying a non-linear transform function to the luminance intensity values of edge defining pixels in the input image, the non-linear transform function comprising:
assigning contrast enhancement values to a predetermined plurality of regions in the input image based on the luminance intensity values of the edge defining pixels;
normalizing each of said assigned contrast enhancement values;
generating a transform function for each of said normalized contrast enhancement values; and
extrapolating said non-linear transform function from said transform function.

34. The apparatus according to claim 33, wherein said range of luminance intensity values comprises luminance intensity values of bright and dark pixels.

35. The apparatus according to claim 34, wherein said luminance intensity values of said bright and dark pixels comprises the range of values possible with a bit depth selected from the group of 8-bits, 12-bits or 16-bits.

36. The apparatus according to claim 33, wherein said range of luminance intensity values comprises luminance intensity values of dark pixels.

37. The apparatus according to claim 36, wherein said luminance intensity values of said dark pixels includes 0-128.

38. The apparatus according to claim 33, wherein said range of luminance intensity values comprises luminance intensity values of bright pixels.

39. The apparatus according to claim 38, wherein said luminance intensity values of said bright pixels includes 129-255.

40. The apparatus according to claim 33, wherein said predetermined plurality of regions comprises 32 regions.

41. The apparatus according to claim 40, wherein each of said 32 regions contains an equal number of luminance intensity values.

42. The apparatus according to claim 41, wherein each of said 32 regions contains 8 luminance intensity values.

43. The apparatus according to claim 33, wherein said contrast enhancement value is assigned in accordance with the formula:

$$c_{vx} = \alpha(N_x/N_{total}),$$

wherein $\alpha$ and $\gamma$ are empirical constants, $N_x$ represents the number of pixels in the corresponding region, and $N_{total}$ represents the total number of pixels.

44. The apparatus according to claim 33, wherein a first region represents a dark region, said apparatus further executing the step of assigning a contrast enhancement value of 1 to said dark region.

45. The apparatus according to claim 44, wherein a last region represents a bright region, said apparatus further executing the step of assigning a contrast enhancement value of 1 to said bright region.

46. The apparatus according to claim 33, wherein said normalizing step is performed in accordance with the formula:

$$C_{vx} = c_{vx}/\text{sum}(c_j),$$

wherein $C_{vx}$ represents an individual normalized contrast enhancement, $c_{vx}$ represents an individual contrast enhancement value assigned to each of said predetermined number of regions, and $c_j$ represents the total of all contrast enhancement values assigned to each of said predetermined plurality of number of regions.

47. The apparatus according to claim 33, wherein said transform function is generated in accordance with the formula:

$$f(x+1) = F(x) + C_{vx},$$

wherein f represents a function applied to each of said predetermined number of regions, F represents the integration function for each of said predetermined number of region, and $C_{vx}$ represents said normalized contrast enhancement value.

48. The apparatus according to claim 33, wherein said extrapolation step is calculated in accordance with the formula:

$$F_Y O_x + C_{vx} * (Y \bmod Z) * P,$$

wherein, F represents a function, Y represents individual intensity levels of said input luminance histogram, $C_{vx}$ represents the normalized contrast enhancement values assigned to each of said predetermined number of regions, Z represents a number of intensity levels divided by P, P represents the number of predetermined number of regions, and $O_x = \text{sum}(C_M) * I$, wherein $C_M$ represents the assigned contrast enhancement value of an individual intensity level added to each contrast enhancement value of a preceding individual intensity, and I represents the number of intensity value of said input luminance histogram.

* * * * *

UNITED STATES PATENT AND TRADEMARK OFFICE
CERTIFICATE OF CORRECTION

PATENT NO. : 7,386,186 B2  
APPLICATION NO. : 10/927308  
DATED : June 10, 2008  
INVENTOR(S) : Ovsiannikov Page 1 of 1

It is certified that error appears in the above-identified patent and that said Letters Patent is hereby corrected as shown below:

In column 11, line 67, in Claim 32, delete "$F_Y=O_xC_{vx}*(Y \bmod Z)*P,$" and insert -- $F_Y=O_x +C_{vx}*(Y \bmod Z)*P,$ --, therefor.

In column 12, line 60, in Claim 43, delete "$c_{vx}=\alpha(N_x/N_{total}),$" and insert -- $C_{vx}=\alpha(N_x/N_{total})^Y$ --, therefor.

In column 14, line 8, in Claim 48, delete "$F_YO_x+C_{vx}*(Y \bmod Z)*P,$" and insert -- $F_Y=O_x+C_{vx}*(Y \bmod Z)*P,$ --, therefor.

Signed and Sealed this

Nineteenth Day of August, 2008

JON W. DUDAS  
*Director of the United States Patent and Trademark Office*